United States Patent
Wu

(10) Patent No.: US 6,965,518 B2
(45) Date of Patent: Nov. 15, 2005

(54) POWER CONVERTER WITH OUTPUT VOLTAGE LEVEL INDICATING DEVICE

(75) Inventor: Michael Wu, Hsin Tien (TW)

(73) Assignee: Golden Bridge Electech Inc., Taipei (TW)

( * ) Notice: Subject to any disclaimer, the term of this patent is extended or adjusted under 35 U.S.C. 154(b) by 0 days.

(21) Appl. No.: 10/892,111

(22) Filed: Jul. 16, 2004

(65) Prior Publication Data

US 2005/0219882 A1    Oct. 6, 2005

(30) Foreign Application Priority Data

Apr. 6, 2004    (TW) ............................. 93109490 A

(51) Int. Cl.$^7$ ............................................. H02M 1/00
(52) U.S. Cl. .................................................. 363/146
(58) Field of Search .................. 363/146, 15; 323/293, 323/297

(56) References Cited

U.S. PATENT DOCUMENTS 5,689,413 A * 11/1997 Jaramillo et al. ........... 363/146
6,560,131 B1 * 5/2003 vonBrethorst ............... 363/146
6,628,535 B1 * 9/2003 Wu ............................. 363/146

* cited by examiner

Primary Examiner—Adolf Berhane
(74) Attorney, Agent, or Firm—Rosenberg, Klein & Lee

(57) ABSTRACT

A power converter with output voltage level indicating device is disclosed. The power converter includes a casing, an interior of which is disposed with a control circuit. The control circuit includes a feedback circuit and a DC-to-DC conversion circuit. The feedback circuit is coupled to the DC-to-DC conversion circuit and connected to a level-selecting terminal by at least one resistor to provide a feedback signal to the DC-to-DC conversion circuit which in turn changes the voltage level of the DC output. An output socket is formed at the casing, which is connected with the control circuit. The output socket includes two primary, power terminals and at least one secondary, level-selecting terminals. A level-selecting terminal device is connected to the output socket via an extension cable for getting the DC voltage and supplying the DC voltage to an appliance via an output terminal. A display device is provided at the casing for showing the output voltage level to the output terminal of the level-selecting terminal device.

16 Claims, 10 Drawing Sheets

POWER CONVERTER WITH OUTPUT VOLTAGE LEVEL INDICATING DEVICE

BACKGROUND OF THE INVENTION

1. Field of the Invention

The present invention relates generally to a power converter, and in particular to a power converter comprising an output voltage level indicating device for indication and easy reading of output level of voltage.

2. Description of the Prior Art

Portable electronic appliances, such as mobile phone and notebook computer, play an important role in the modern world in doing business and society activities. Such portable appliances are often powered by built-in power sources, which must be constantly recharged in order to maintain operability of the portable appliances. Also, external powering is also available for most of the portable appliances, such as wall outlet, automobile electrical system including cigarette lighter socket and electrical socket regularly available in airplanes. Often the external powering must be converted by for example a conversion circuit made in the form of an adaptor before it can be supplied to the portable appliances.

However, the portable appliances are often operated with different working voltages and for such a reason, the general consumers that own and use two or more different portable appliance must regularly bring two or more adaptors corresponding to those portable appliances. This complicates the use of the portable appliances and is very troublesome to the consumers. U.S. Pat. No. 6,628,535, issued to the present inventor, teaches a power converter that provides selectable output voltage levels to different appliances or loads. The power converter of the '535 patent comprises an output to which a terminal connector is selectively coupled. The terminal connector comprises a circuit comprised of resistors that generates a feedback signal to a control circuit of the power converter, inducing a corresponding voltage level at the output of the conversion device.

Such a conventional power converter works well in supplying voltage of different levels to electronic appliances that operates with different working voltages. It, however, is still unclear to a user what voltage level is being output by the power converter when the device is powering an electronic appliance. This may cause problem to the user.

Thus, the present invention is aimed to provide a power converter that overcomes the drawback of the conventional devices.

SUMMARY OF THE INVENTION

An object of the present invention is to provide a power converter that is capable to display the output voltage level. The power converter comprises a display device for showing the voltage level at the output terminal of the level-selecting terminal device.

Another object of the present invention is to provide a portable power converter with output voltage level display device. The power converter is engageable with various level-selecting terminal device. By means of the display device, the output voltage level at the output terminal of the level-selecting terminal device is shown.

To achieve the above objects, in accordance with the present invention, there is provided a power converter with output voltage level indicating device. The power converter includes a casing, an interior of which is disposed with a control circuit. The control circuit includes a feedback circuit and a DC-to-DC conversion circuit. The feedback circuit is coupled to the DC-to-DC conversion circuit and connected to a level-selecting terminal by at least one resistor to provide a feedback signal to the DC-to-DC conversion circuit which in turn changes the voltage level of the DC output. An output socket is formed at the casing, which is connected with the control circuit. The output socket includes two primary, power terminals and at least one secondary, level-selecting terminals. A level-selecting terminal device is connected to the output socket via an extension cable for getting the DC voltage and supplying the DC voltage to an appliance via an output terminal. A display device is provided at the casing for showing the output voltage level to the output terminal of the level-selecting terminal device.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
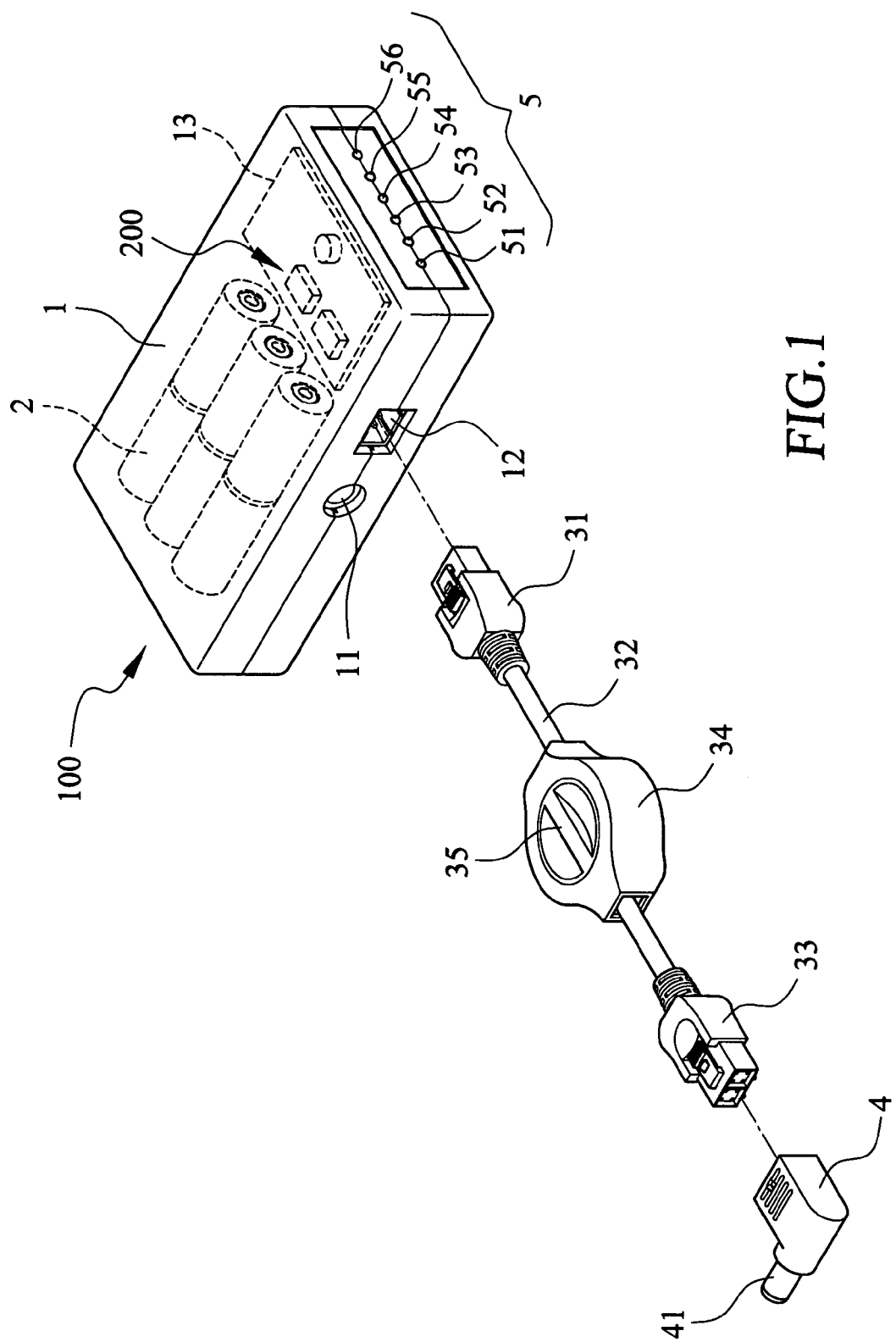
FIG. 1 is a perspective view of a power converter constructed in accordance with a first embodiment of the present invention with connection cables detached therefrom.

With reference to the drawings and in particular to FIG. 1, a power converter constructed in accordance with the present invention, generally designated with reference numeral 100, comprises a casing 1. A plurality of rechargeable batteries 2 are disposed in an interior of the casing 1, which is used for supplying a DC voltage.

The casing 1 is provided with an input socket 11 with which a plug of a power cord connecting to a power source (not shown) is engageable for charging the rechargeable batteries 2. The casing 1 is formed with an output socket 12 for connecting to a device-side plug 31 at one end of an extension cable 32. A circuit board 13 is arranged in an interior of the power converter 1, which comprises a control circuit 200.

The other end of the extension cable 32 is formed with an appliance-side connector 33 which is engageable with a level-selecting terminal device 4. The level-selecting terminal device 4 is formed with an output terminal 41 for providing a selectable DC voltage output.

The extension cable 32 is releasably stowed in a cable-winding device 34 to avoid entangling of the extension cable 32. A button 35 is provided on a top surface of the cable-winding device 34 for rewinding the extension cable 32.

At an appropriate position of the casing 1, there is disposed with a display device 5 which is capable to indicate/display the DC output voltage level provided via the output terminal 41 of the level-selecting terminal 4. When connecting to different level-selecting terminal device 4, the display device 5 is able to indicate the real DC output voltage level.

Figure 4:
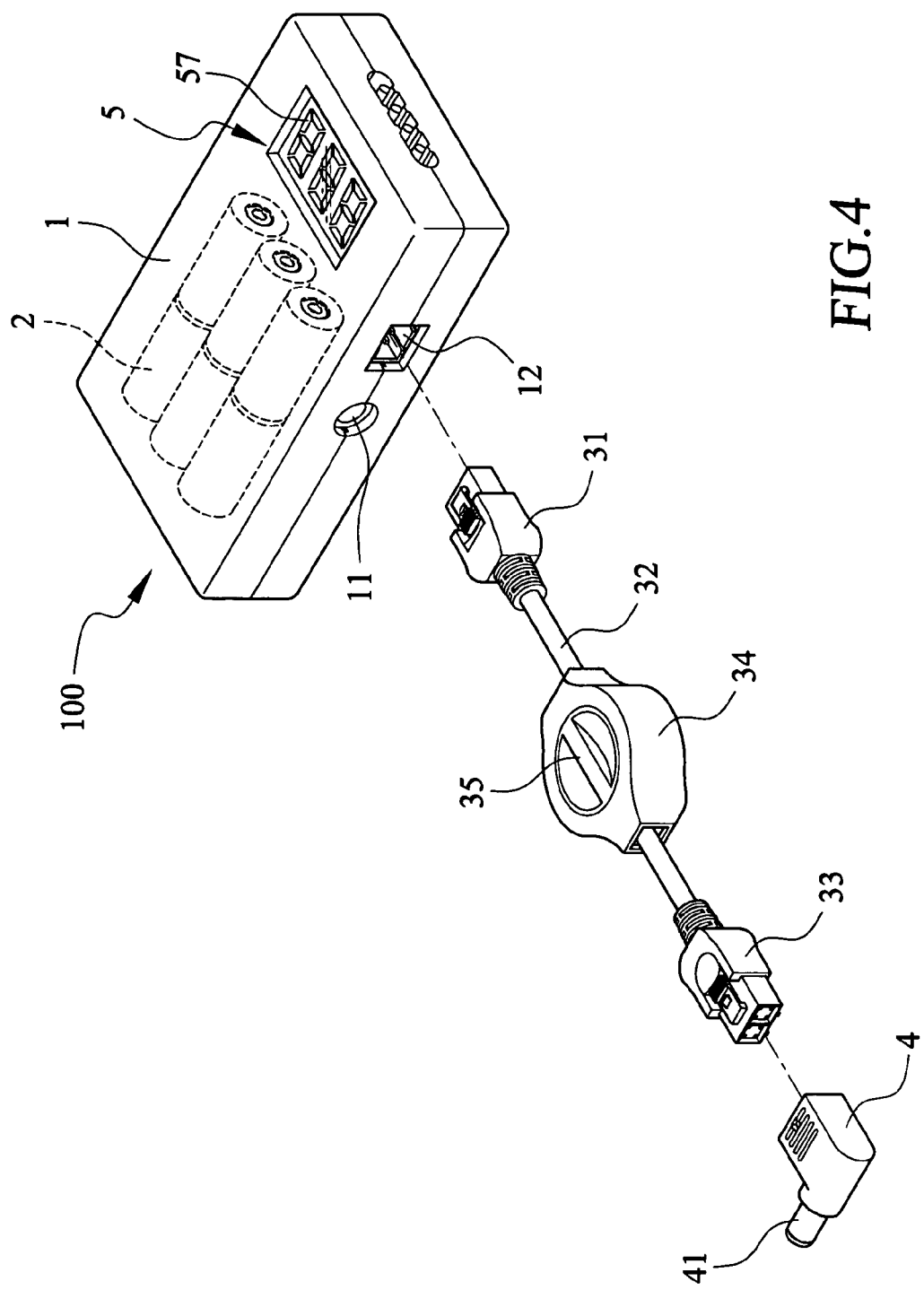
FIG. 4 is a perspective view of a second embodiment of the power converter in accordance with the present invention.

The display device 5 comprises a plurality of indicators 51~56 for showing the DC voltage output through the output terminal 41 of the level-selecting terminal 4. Each of the indicators corresponds to a different DC output voltage level. The user can easily know from the lighting indicator 51~56 the real DC voltage output of the level-selecting terminal device 4. Alternatively, the display device 5 may comprise a liquid crystal display device 57 for indicating the DC voltage output through the output terminal 41 of the level-selecting terminal device 4, as shown in FIG. 4.

Figure 2:
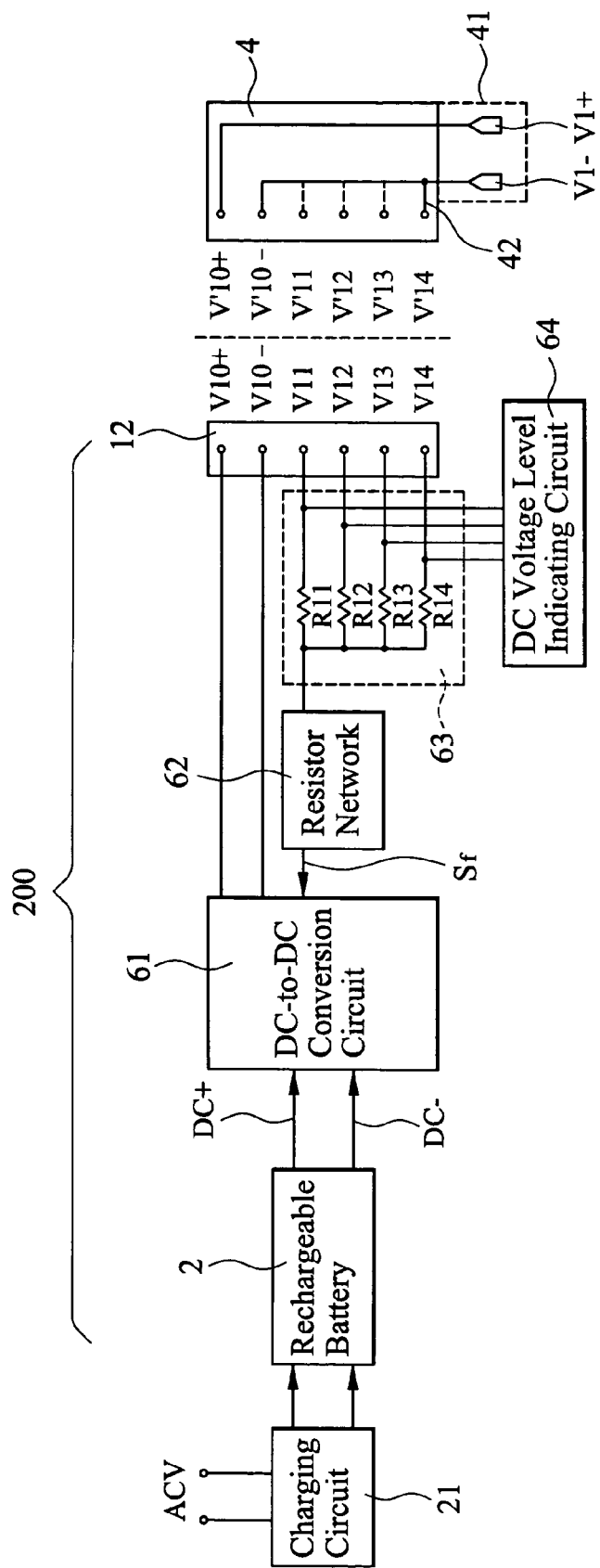
FIG. 2 is a block diagram of a control circuit of the power converter of FIG. 1.

Also referring to FIG. 2, which shows a block diagram of a control circuit of the power converter, the control circuit 200 comprises a DC-to-DC conversion circuit 61, a feedback circuit 62, a resistor network 62 and a DC voltage level indicating circuit 64.

The DC output terminals DC+, DC− of the rechargeable batteries 2 are directly coupled to the DC-to-DC conversion circuit 61 for supplying power. The rechargeable batteries 2 are charged by an AC power ACV via a charging circuit 21.

The output socket 12 comprises two primary, power terminals V10+, V10− and a plurality of secondary, level-selecting terminals V11, V12, V13, and V14. The resistor network 63 and the feedback circuit 62, which are connected in series, are connected between the output socket 12 and the DC-to-DC conversion circuit 61 for generating a feedback signal Sf to the DC-to-DC conversion circuit 35. The resistor network 36 is comprised of resistors R11, R12, R13, and R14, which are in turn connected respectively to the level-selecting terminals V11, V12, V13, and V14 of the output socket 12.

The DC voltage level indicating circuit 64 is connected to the secondary, level-selecting terminals V11, V12, V13, and V14 of the first resistor network 63. The level-selecting terminal device 4 is also comprised of primary and secondary terminals V'10+, V'10−, V'11, V'12, V'13, and V'14, which are respectively connected to the primary and secondary terminals V10+, V10−, V11, V12, V13, and V14 of the output socket 12, when the level-selecting terminal device 4 is connected to the output socket 12 by means of the extension cable 32.

By selective use of different jump connection 42 between the secondary terminals V'11, V'12, V'13, and V'14 and the primary terminal V'10−, a different resistance is observed in the resistor network 36, which changes the feedback signal Sf and thereby changes the output level of voltage at the output terminal V1+, V1− of the level-selecting terminal device 4. The output level of voltage at output V1+, V1− is displayed on the display device 5.

Figure 3:
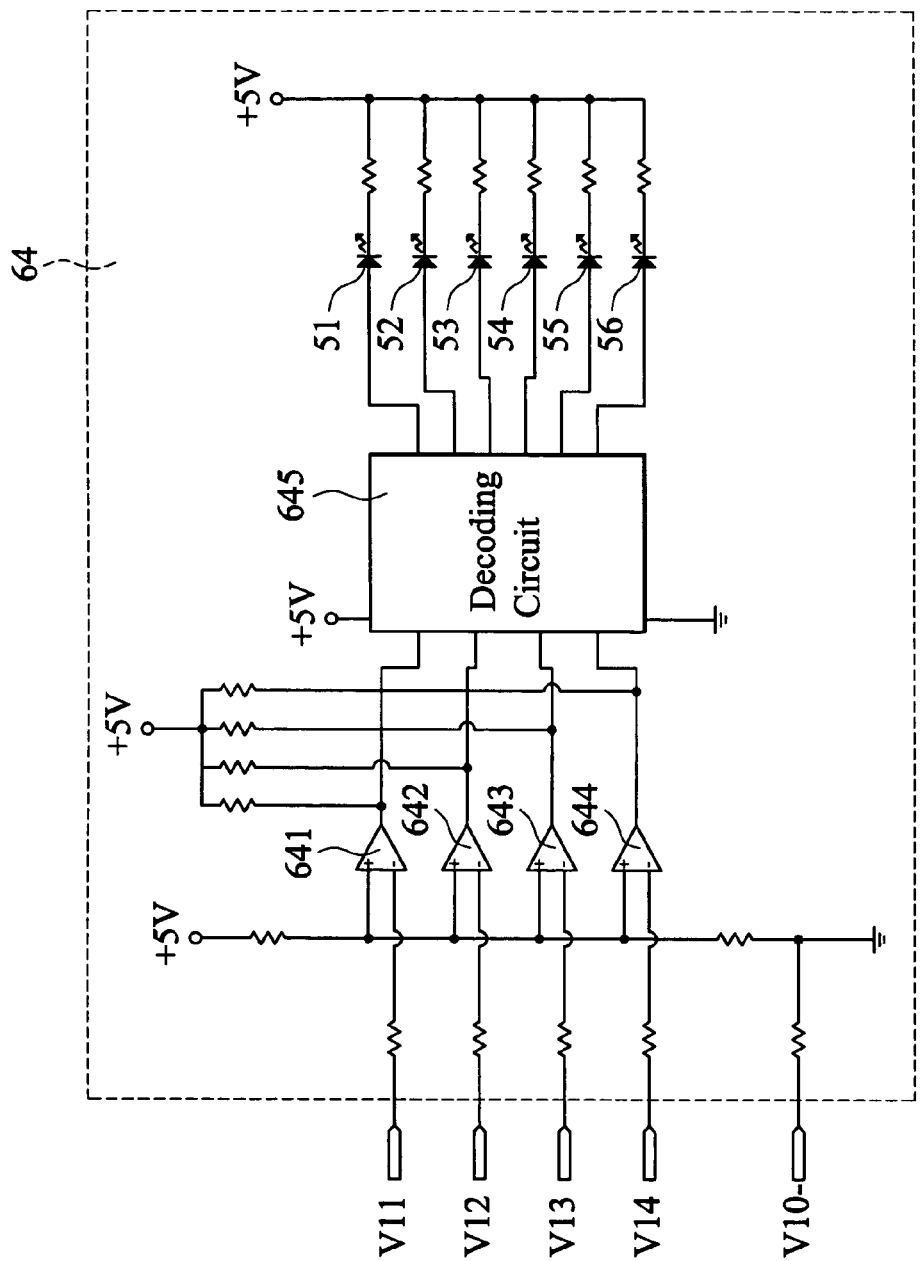
FIG. 3 is a block diagram of a DC voltage level indicating circuit of FIG. 2.

Also referring to FIG. 3, a block diagram of the DC voltage level indicating circuit 64 is shown. The DC voltage level indicating circuit 64 comprises operational amplifiers 641, 642, 643, 644 each having a first input connected to the level-selecting terminals V11, V12, V13, and V14 of the resistor network 63 whereby each operational amplifier 641, 642, 643, 644 and the associated resistor R11, R12, R13, R14 forms a comparison circuit. Each operational amplifier 641, 642, 643, 644 has a second input connected to a power source of +5V. Each operational amplifier 641, 642, 643, 644 has an output coupled to and applying an output signal to a decoding circuit 645, which in turn generates output signals applied to and driving the indicators 51~56. Thus, the indicators 51~56 shows to a user the voltage level at the output V1+, V1+.

Also referring to FIG. 4, a power converter constructed in accordance with a second embodiment of the present invention is shown. The second embodiment is substantially identical to the first embodiment with reference to FIG. 1, except that the display device 5 comprises a liquid crystal display device 57. The voltage level of the level-selecting terminal device 4 is displayed at the liquid crystal display 57.

Figure 5:
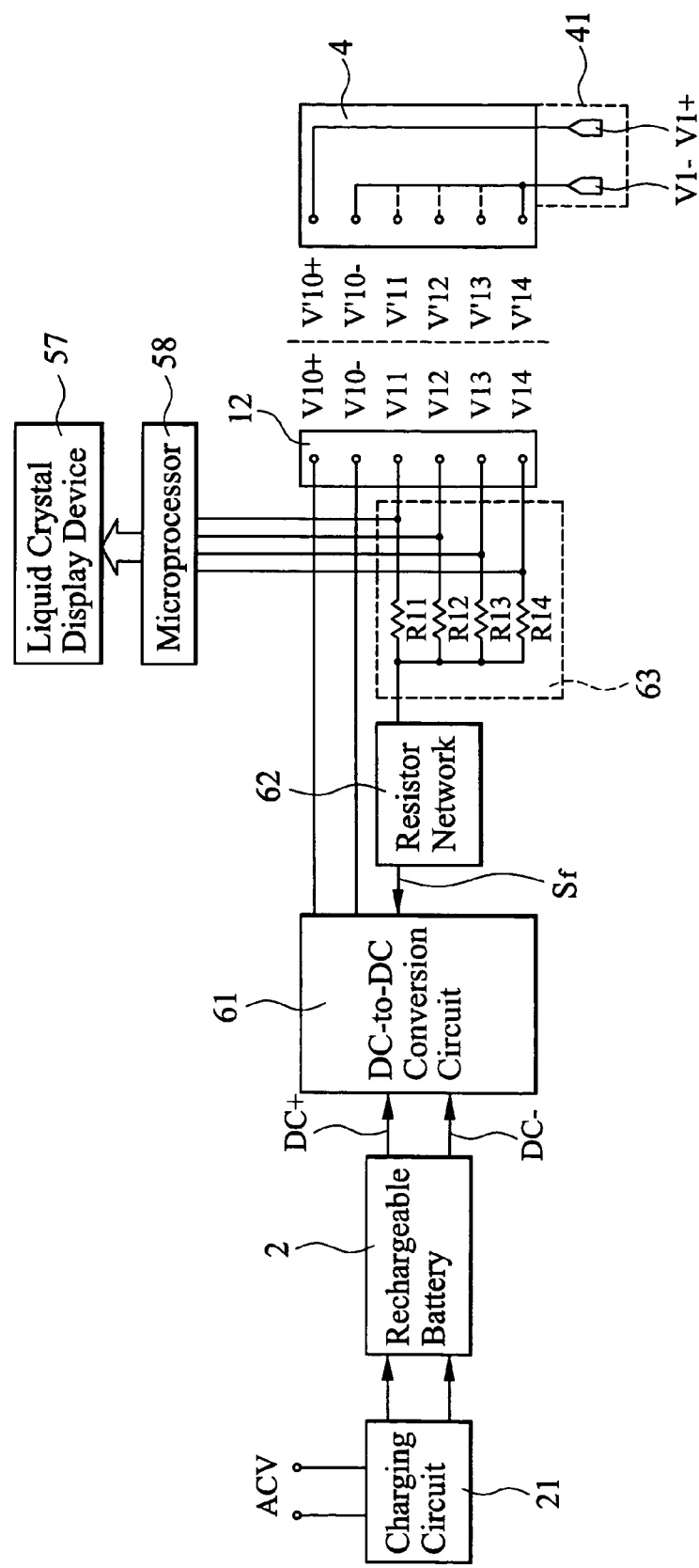
FIG. 5 is a block diagram of the control circuit of the power converter of FIG. 4.

A block diagram of a control circuit of the second embodiment is shown in FIG. 5. A microprocessor 58 is coupled, via any known interface, to the resistor network 63 to detect the voltage level. The microprocessor 58 decodes and calculates to generate a signal to control the liquid crystal display 57 to display the voltage level as well as other electrical parameters. The DC voltage level indicating circuit 64 of the power converter 100 is thus omitted here.

Figure 6:
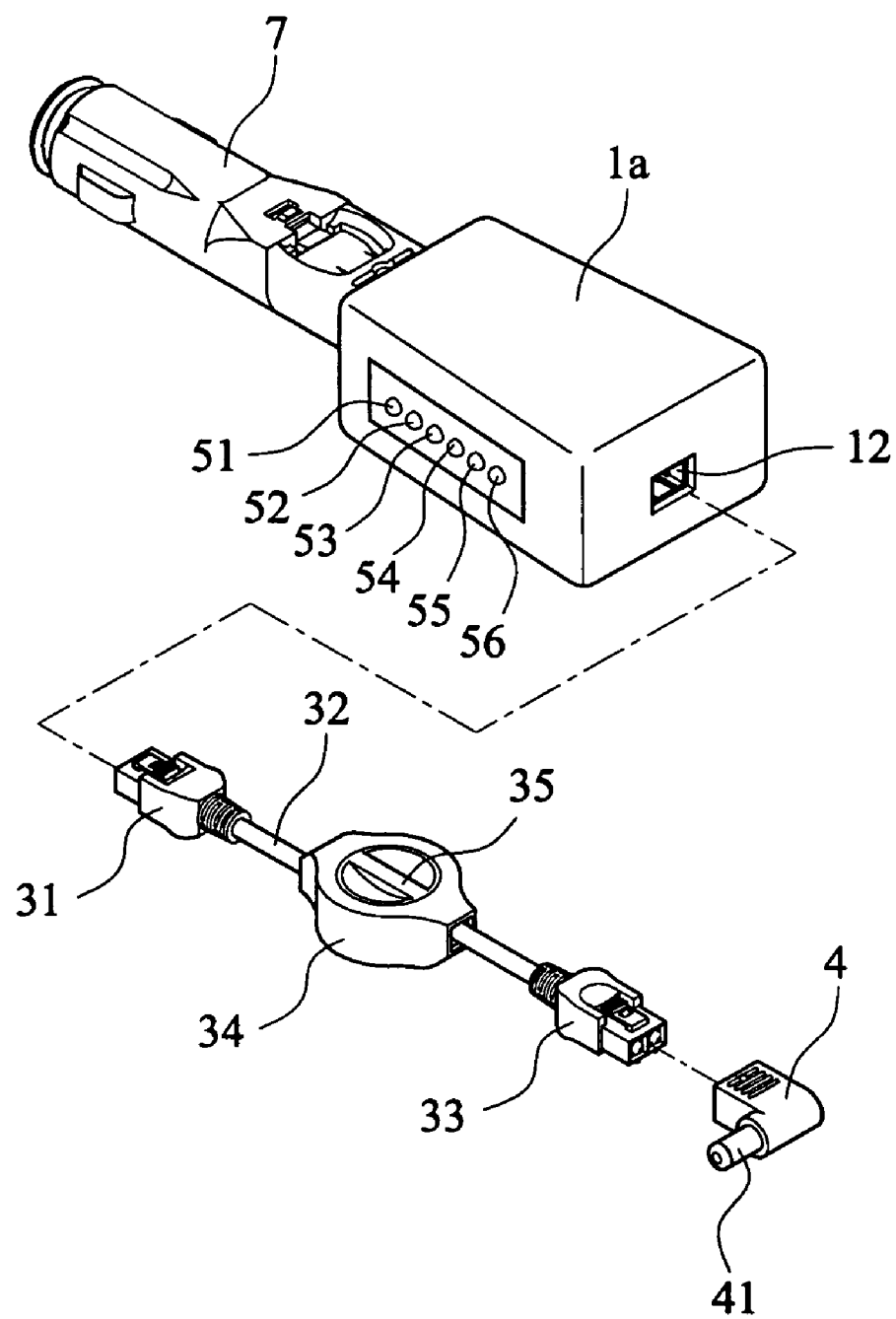
FIG. 6 is a perspective view of a third embodiment of the power converter in accordance with the present invention.

FIG. 6 shows a perspective view of a third embodiment of the power converter of the present invention. The third embodiment is substantially similar to the first and second embodiments, and like reference numerals are used to identify elements that are similar or identical in the embodiments. In the third embodiment, the casing 1a is incorporated with a lighter plug 7 which is engageable with a standard cigarette lighter socket 7 (not shown) provided in an automobile or airplane. The casing 1a is formed with a plurality of indicators 51~56 for showing the DC voltage output at the output terminal 41 of the level-selecting terminal device 4. Each of the indicators corresponds to a different DC voltage level. The user can easily know from the lighting indicator 51~56 the real DC voltage output to the level-selecting terminal device 4. The casing 1a also comprises a control circuit and DC voltage level indicating circuit similar to those shown in FIGS. 2 and 3.

Figure 7:
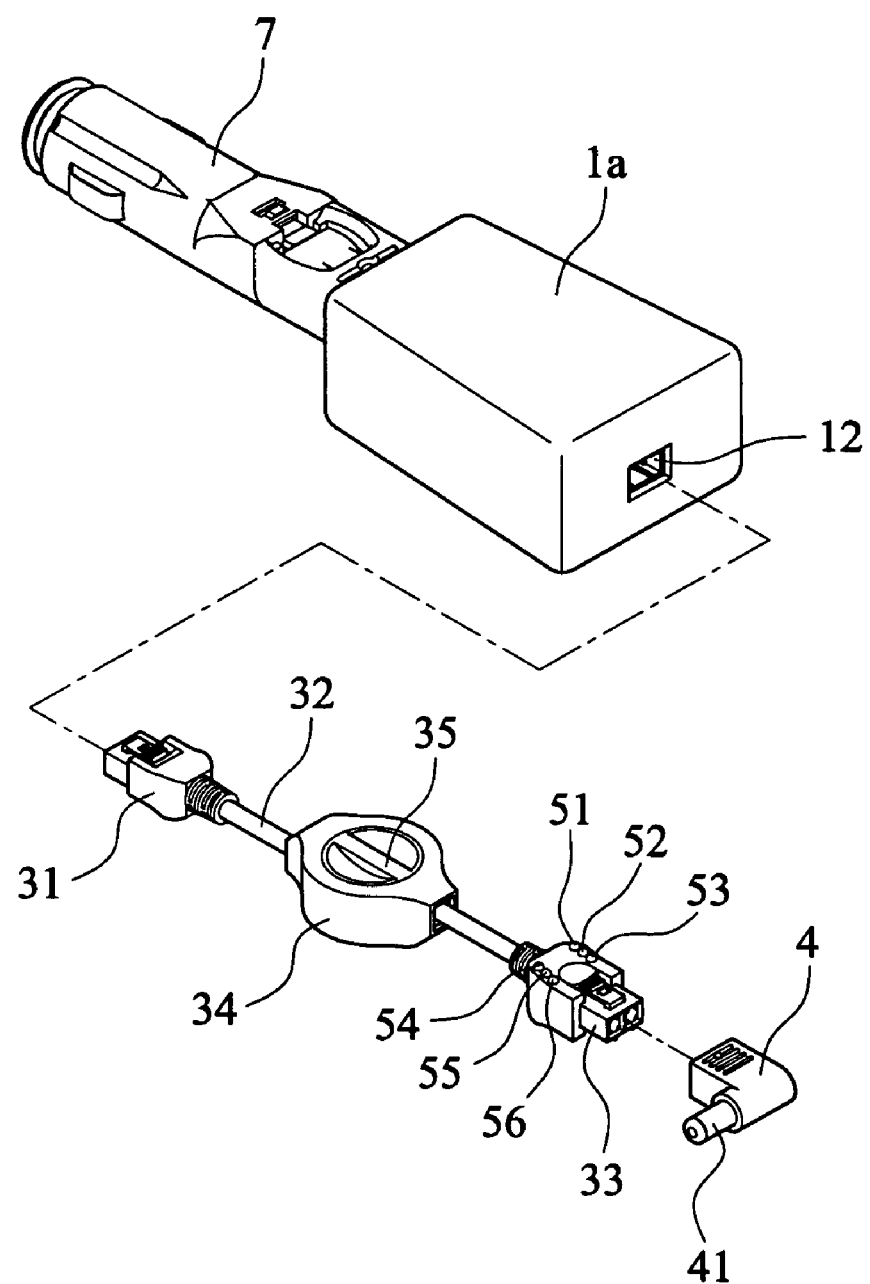
FIG. 7 is a perspective view of a fourth embodiment of the power converter in accordance with the present invention.

Please refer to FIG. 7, which is a perspective view of a fourth embodiment of the power converter of the present invention. The fourth embodiment is different from the third embodiment in that the indicators 51~56 are provided at the appliance-side connector 33. By means of the indicators 51~56, the DC voltage output to the output terminal 41 of the level-selecting terminal device 4 is shown.

Figure 8:
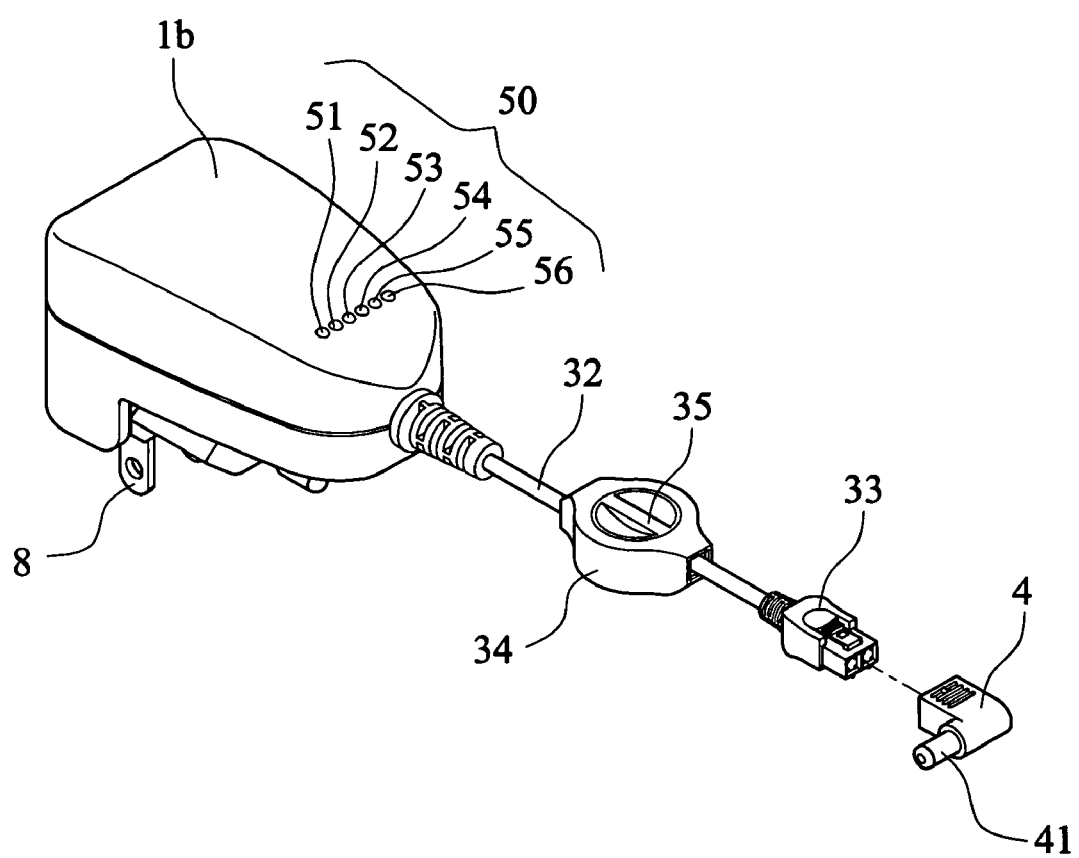
FIG. 8 is a perspective view of a fifth embodiment of the power converter in accordance with the present invention.

FIG. 8 is a perspective view of a fifth embodiment of the power converter. In this embodiment, the casing 1b is formed with an AC plug 8 for engaging to an AC socket or electrical main, such as a wall outlet (not shown). Preferably, the AC plug 8 comprises a plurality of changeable pins for plugging to different types of sockets and power sources e.g. 110V or 220V.

Figure 9:
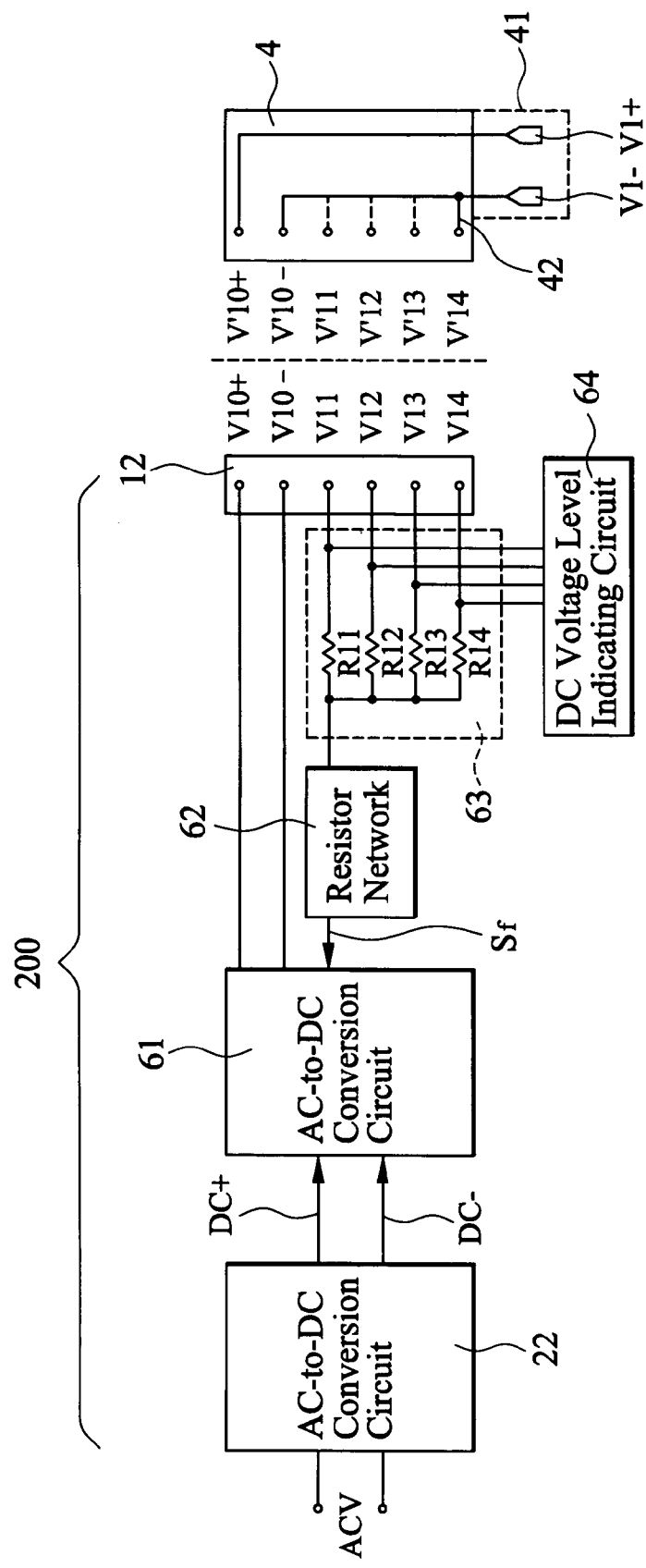
FIG. 9 a block diagram of the control circuit of the power converter of FIG. 8.

With reference to FIG. 9, a block diagram of the control circuit of the fifth embodiment is shown. The control circuit of the fifth embodiment is substantially similar to the control circuit of the first embodiment shown in FIG. 2. The control circuit 200 comprises a DC-to-DC conversion circuit 61, a feedback circuit 62, a resistor network 63 and a DC voltage level indicating circuit 64. The control circuit 200 further comprises a AC-to-DC conversion circuit 22 which converts the AC supply from a power ACV into DC power that is then applied to the DC-to-DC conversion circuit 61. The power converter 100 comprises a control circuit 200 and a DC voltage level indicating circuit that is substantially identical to that of the first embodiment.

The casing 1b is formed with a plurality of indicators 51~56 for showing the DC voltage output to the output terminal 41 of the level-selecting terminal device 4.

Figure 10:
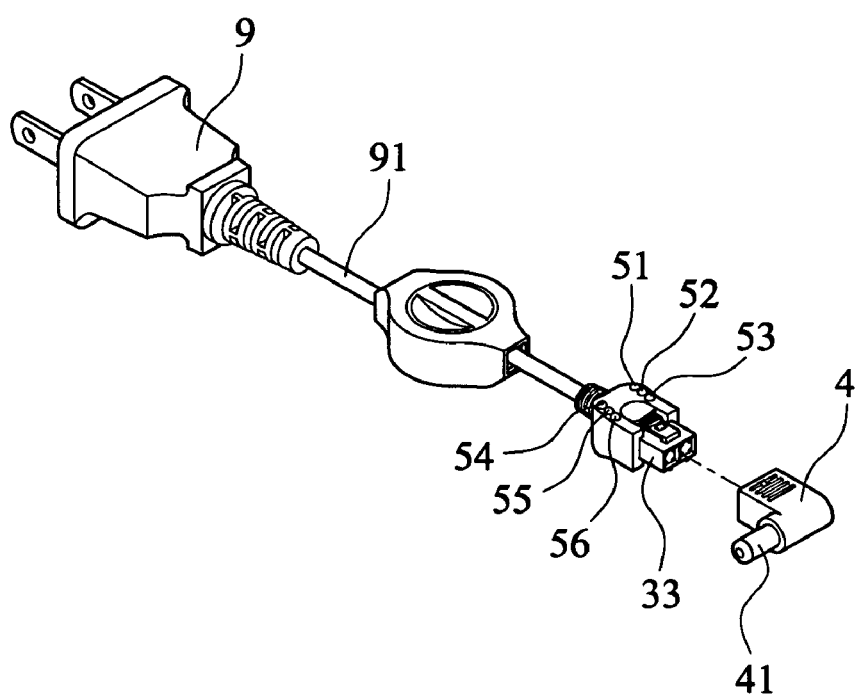
FIG. 10 is a perspective view of a sixth embodiment of the power converter in accordance with the present invention.

FIG. 10 shows a perspective view of a sixth embodiment of the power converter of the present invention. In this embodiment, the extension cable 91 has opposite ends forming an appliance-side connector 33 and a device-side plug 9, respectively. The device-side plug 9 comprises a conventional AC plug for plugging to AC socket. The power converter 100 comprises a control circuit that is substantially identical to that shown in FIG. 2. The appliance-side connector 33 is engageable with a level-selecting terminal device 4 for supplying a selectable DC voltage via the output terminal 41. The appliance-side connector 33 is provided with a plurality of indicators 51~56 for showing the DC voltage output to the output terminal 41 of the level-selecting terminal device 4.

Although the present invention has been described with reference to the preferred embodiments thereof, it is apparent to those skilled in the art that a variety of modifications and changes may be made without departing from the scope of the present invention intended to be defined by the appended claims.

What is claimed is:

1. A power converter comprising:
   a casing;
   at least one rechargeable battery, which is disposed in an interior of the casing for supplying a DC voltage;
   an output socket disposing at one side of the casing and connecting to a control circuit, which comprises two primary, power terminals and at least one secondary, level-selecting terminal;
   a circuit board disposing at the interior of the casing, which comprises a control circuit including a feedback circuit and a DC-to-DC conversion circuit, in which the feedback circuit is coupled to the DC-to-DC conversion circuit and connected to the level-selecting terminal by at least one resistor;
   a level-selecting terminal device, which is engageable with the output socket and comprises two primary, power terminals and at least one secondary, level-selecting terminal, and when the level-selecting terminal device is connected to the output socket, the primary and secondary terminals of the level-selecting terminal device are respectively connected to the primary and secondary terminals of the output socket for receiving the selectable DC voltage therefrom and transmitting the selectable DC voltage through an output terminal of the level-selecting terminal device;
   a display device, which is disposed at a top of the casing and connected with the control circuit to display the voltage level of the DC output voltage at the output terminal of the level-selecting terminal device.

2. The power converter as claimed in claim 1, wherein the display circuit comprises a plurality of indicators, each of which corresponds to a different DC voltage level for indicating the output voltage level from the output socket.

3. The power converter as claimed in claim 1, wherein the display circuit comprises a liquid crystal display unit for displaying the output voltage level from the output socket.

4. The power converter as claimed in claim 1, wherein the casing further comprises an input socket, with which a plug of a power cord connecting to a power source is engageable for charging the rechargeable battery by a charging circuit.

5. The power converter as claimed in claim 1, wherein the power converter further comprises a connector connecting to a plug via an extension cable, the plug being engageable with the output socket of the casing and the connector comprising two primary, power terminals and at least one secondary, level-selecting terminal in corresponding to the primary and secondary terminals of the output socket.

6. The power converter as claimed in claim 1, wherein the output socket comprising two primary, power terminals and a plurality of secondary, level-selecting terminals, each of the level-selecting terminals being connected to the feedback circuit by a resistor, and the level-selecting terminal device comprises a plurality of jump connections, wherein by selective use of the jump connection, a different resistance is observed which changes the feedback signal and thereby changes the output level of voltage at the output terminal of the level-selecting terminal device.

7. A power converter comprising:
   a casing;
   a lighter plug, which is incorporated with the casing and is engageable with a standard cigarette lighter socket for receiving a power therefrom;
   an output socket disposing at one side of the casing and connecting to a control board, which comprises two primary, power terminals and at least one secondary, level-selecting terminal;
   a circuit board disposing at the interior of the casing, which comprises a control circuit including a feedback circuit and a DC-to-DC conversion circuit, in which the feedback circuit is coupled to the DC-to-DC conversion circuit and connected to the level-selecting terminal by at least one resistor;
   a level-selecting terminal device, which is engageable with the output socket and comprises two primary, power terminals and at least one secondary, level-selecting terminal, and when the level-selecting terminal device is connected to the output socket, the primary and secondary terminals of the level-selecting terminal device are respectively connected to the primary and secondary terminals of the output socket for receiving the selectable DC voltage therefrom and transmitting the selectable DC voltage through an output terminal of the level-selecting terminal device;
   a display device, which is disposed at a top of the casing and connected with the control circuit to display the voltage level of the DC output voltage at the output terminal of the level-selecting terminal device.

8. The power converter as claimed in claim 7, wherein the display circuit comprises a plurality of indicators, each of which corresponds to a different DC voltage level for indicating the output voltage level from the output socket.

9. The power converter as claimed in claim 7, wherein the display circuit comprises a liquid crystal display unit for displaying the output voltage level from the output socket.

10. The power converter as claimed in claim 1, wherein the power converter further comprises a connector connecting to a plug via an extension cable, the plug being engageable with the output socket of the casing and the connector comprising two primary, power terminals and at least one secondary, level-selecting terminal in corresponding to the primary and secondary terminals of the output socket.

11. The power converter as claimed in claim 7, wherein the output socket comprising two primary, power terminals and a plurality of secondary, level-selecting terminals, each of the level-selecting terminals being connected to the feedback circuit by a resistor, and the level-selecting terminal device comprises a plurality of jump connections, wherein by selective use of the jump connection, a different resistance is observed which changes the feedback signal and thereby changes the output level of voltage at the output terminal of the level-selecting terminal device.

12. A power converter comprising:
a casing;
an alternating current plug, which is incorporated with the casing and is engageable with an AC socket for receiving an AC power therefrom;
an output socket disposing at one side of the casing and connecting to a control circuit, which comprises two primary, power terminals and at least one secondary, level-selecting terminal;
a circuit board disposing at the interior of the casing, comprising a control circuit and an AC-to-DC conversion circuit, in which the control circuit includes a feedback circuit and a DC-to-DC conversion circuit, and the feedback circuit is coupled to the DC-to-DC conversion circuit and connected to the level-selecting terminal by at least one resistor, and the AC-to-DC conversion circuit converts the AC power from AC socket into DC power;
a level-selecting terminal device, which is engageable with the output socket and comprises two primary, power terminals and at least one secondary, level-selecting terminal, and when the level-selecting terminal device is connected to the output socket, the primary and secondary terminals of the level-selecting terminal device are respectively connected to the primary and secondary terminals of the output socket for receiving the selectable DC voltage therefrom and transmitting the selectable DC voltage through an output terminal of the level-selecting terminal device;
a display device, which is disposed at a top of the casing and connected with the control circuit to display the voltage level of the DC output voltage at the output terminal of the level-selecting terminal device.

13. The power converter as claimed in claim 12, wherein the display circuit comprises a plurality of indicators, each of which corresponds to a different DC voltage level for indicating the output voltage level from the output socket.

14. The power converter as claimed in claim 12, wherein the display circuit comprises a liquid crystal display unit for displaying the output voltage level from the output socket.

15. The power converter as claimed in claim 12, wherein the power converter further comprises a connector connecting to a plug via an extension cable, the plug being engageable with the output socket of the casing and the connector comprising two primary, power terminals and at least one secondary, level-selecting terminal in corresponding to the primary and secondary terminals of the output socket.

16. The power converter as claimed in claim 12, wherein the output socket comprising two primary, power terminals and a plurality of secondary, level-selecting terminals, each of the level-selecting terminals being connected to the feedback circuit by a resistor, and the level-selecting terminal device comprises a plurality of jump connections, wherein by selective use of the jump connection, a different resistance is observed which changes the feedback signal and thereby changes the output level of voltage at the output terminal of the level-selecting terminal device.

* * * * *